United States Patent Office 3,784,512
Patented Jan. 8, 1974

3,784,512
COLOR STABILIZED ACID-DYEABLE ACRYLONI-TRILE-CONTAINING FIBERS
James C. Masson, Chapel Hill, and Albert M. Hall, Durham, N.C., assignors to Monsanto Company, St. Louis, Mo.
No Drawing. Filed Mar. 28, 1972, Ser. No. 238,959
Int. Cl. C08f 45/58, 45/62
U.S. Cl. 260—45.95 P                                                    3 Claims

ABSTRACT OF THE DISCLOSURE

A method and product is herein described for imparting color stability to acid-dyeable acrylonitrile/bromine-containing polymers capable of being formed into filaments comprising forming an acid-dyeable acrylonitrile/bromine-containing polymer comprising at least 60 weight percent acrylonitrile, 1 to 15 weight percent of a bromine-containing monomer, and 1 to 8 weight percent of a basic monomer selected from the group consisting of free radical polymerizable unsaturated aliphatic amines, substituted ammonium bases, and mixtures thereof, and contacting said polymers with an organophosphorus compound in an amount not exceeding about one equivalent per equivalent of said aliphatic amines, substituted ammonium basic groups, or mixtures thereof, incorporated in said polymer, said organophosphorus compound being represented by the formula formula:

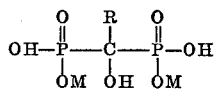

wherein M is a member selected from the group consisting of hydrogen, sodium, lithium, potassium, and R is a member selected from the group consisting of an alkyl radical having one to eleven carbon atoms, a phenyl radical, and an alkyl phenyl radical containing no more than eight carbon atoms.

BACKGROUND OF THE INVENTION

(a) Field of the invention

This invention relates to a process for preparing certain acrylonitrile-containing fibers, and more particularly it relates to a method for preparing fibers containing polymers of acrylonitrile and certain basic monomers in order to heat stabilize said fibers and the articles produced therefrom.

(b) Description of the prior art

Acrylonitrile homopolymers, copolymers, and interpolymers containing at least 60 percent or more acrylonitrile are generally insoluble in the more common solvents. Even in suitable solvents, the rate of solution at ambient temperature is low. In order to effect solution, heat is generally applied which often results in a darkening of the polymer solution, an undesirable effect which becomes more noticeable upon standing for prolonged periods of time. It is believed that the presence of certain substances and, in particular, certain ions, such as iron, copper, and manganese in trace concentrations, contribute to this darkening effect. The employment of solvents such as dimethylacetamide or dimethylformamide may intensify the coloration; it is believed that several impurities often present in such solvents add to this effect. Further, it has been observed that basic monomers when incorporated to make a fiber dye receptive to acid dyes add to the discoloration. It has also been observed that acrylic fibers containing units derived from basic comonomers such as amines or tetrasubstituted ammonium salts may suffer further color deterioration during the fiber spinning process, especially during drying and annealing. In addition, the fibers oftentimes have unfavorable color stability toward heating encountered in their further processing or in actual use, e.g., curing of latex backed carpets, ironing of apparel, etc.

A number of organic additives have been used in an attempt to resolve these problems. Certain optical whitening agents have been used in conjunction with spinning solutions with some degree of success. It is realized that the use of such agents do not actually remove the factors which cause discoloration and, therefore, do not actually resolve the color stabilization problem. Further, a number of processes have been employed using various sequestering agents in the washing process which, in effect, remove metallic ions. Ethylenediaminetetraacetic acid is a well-known sequestering agent and has been employed as a spinning dope additive for removing trace amounts of metal ions from acrylonitrile polymer articles. Aside from the requirement of thorough washing to remove this particular organic acid, it is found that its salts are poorly soluble in organic solvents employed for the production of acrylonitrile polymers and may cause fouling of heat exchangers when the solvent is recovered by distillation.

The heat instability of acid dyeable acrylonitrile-containing polymers may be due, in part, to the presence of basic groups which react with nitrile groups resulting in formation of conjugated —C=N— structures. Seemingly, the conjugated —C=N— chromophore is the source of the undesirable yellowing. A number of organic and inorganic acids have been utilized as stabilizers in an attempt to overcome this discoloration. Acids presumably protonate the polymeric amine groups and thus reduce their color-forming propensity.

Some acids are suitable for use in stabilizing a spinning solution having a low number of basic groups but are unsuited when there are higher amounts of such groups. For example, a particular acid may act as a stabilizer when used in conjunction with a polymer containing 100–200 μeq./g. of basic amine and ammonium groups, yet when employed at the same relative proportion on a dope containing 1000–15000 μeq./g. of such groups, may cause yellowing. Other acids may stabilize the fiber against yellowing, but are so tightly bound to the basic groups that the dyeability of the fiber is adversely affected.

SUMMARY OF THE INVENTION

A product and process has been discovered which is advantageous in several respects over the prior art, particularly with regard to its markedly improved color stabilization upon exposure to heat.

Accordingly, one aspect is to minimize color formation when solutions of certain acid-dyeable acrylonitrile polymers stand for a prolonged period of time or upon application of heat.

It is also an aspect of the subject invention to prevent color formation in certain acid-dyeable acrylonitrile fibers at elevated temperatures.

A still further aspect of the invention is the production of polymer solutions comprising acid-dyeable acrylonitrile polymers and articles produced therefrom having improved color characteristics.

Other aspects and objects will be apparent from a consideration of the description of the invention herein.

The objects of this invention are accomplished by forming acid dyeable acrylonitrile/bromine-containing polymers capable of being extruded into filaments comprising synthesizing an acid-dyeable acrylonitrile/bromine-containing polymer comprising at least 60 weight percent acrylonitrile, 1 to 15 weight percent of a bromine-containing monomer, and 1 to 8 weight percent of a basic monomer selected from the group consisting of free radical polymerizable unsaturated aliphatic amines, substituted ammonium bases, and mixtures thereof, and contacting said polymer with an organophosphorus compound in an amount not exceeding about one equivalent per equivalent of said aliphatic amine or substituted ammonium basic group incorporated in said polymer, said organophosphorus compound being represented by the general formula

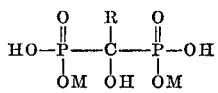

wherein M is a member selected from the group consisting of hydrogen, sodium, lithium, potassium, and R is a member selected from the group consisting of an alkyl radical having one to eleven carbon atoms, a phenyl radical, and an alkyl phenyl radical containing no more than eight carbon atoms.

The term "acrylonitrile/bromine-containing polymers" as used herein denotes (1) polymers comprising at least 60 percent polymerized acrylonitrile and at least one monomer containing bromine copolymerized with said acrylonitrile and (2) blends of (a) polymers including homopolymers of acrylonitrile, or polymers comprising at yeast 60 percent polymerized acrylonitrile and at least one other ethylenically unsaturated monomer copolymerizable with acrylonitrile with (b) polymers of acrylonitrile and at least one monomer containing bromine copolymerized with acrylonitrile. Further, it is understood herein that the phrase "acid dyeable acrylontrile/bromine-containing polymers" are those polymers defined above modified by incorporation of basic sites into the polymer chain, viz, aliphatic amines and substituted ammonium basic groups as well as mixtures thereof. The basic sites in the blend are preferably incorporated in polymer (a).

The organophosphorus compound may be contacted with acrylonitrile polymers in a reaction vessel immediately after their production. Thus, the organophosphorus compound and newly formed polymers when still in a slurry may be mixed, the mixing being carried out by any suitable means adapted to thoroughly disseminate the materials. The treated polymer is then isolated by normal means. The preferred method of practicing this invention, however, involves the addition of the organophosphorus compound to the polymer solvent prior to adding the polymer. In this manner any color that might be developed, as a consequence of heating the mixture to effect solution will be curtailed. Further, the organophosphorus compound may be brought in contact with the freshly spun filaments prior to drying.

Among the solvents which may be used to dissolve acrylonitrile polymers in practicing the subject invention include N,N - dimethylformamide, N,N - dimethylacetamide, ethylene carbonate, dimethyl sulfoxide, and aqueous sodium thiocyanate.

Suitable organophosphorus compounds include the following:

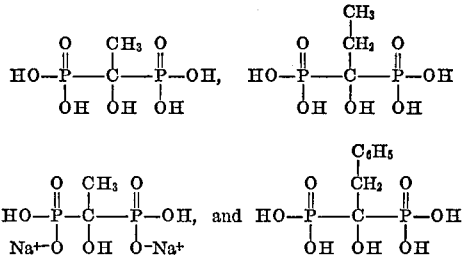

A most preferred organic phosphorus compound is 1-hydroxyethane 1,1-diphosphonic acid. It is preferred that the organophosphorus compounds of the present invention be present in a small amount compared with the amount of polymer dissolved. Thus, although the amount is not absolutely critical, it is preferred that the compound be present in an amount less than about one equivalent per equivalent of the basic monomer units present in the polymer, viz, aliphatic amines and substituted ammonium basic groups incorporated in the acrylonitrile/bromine-containing polymer. A most preferred range is 0.1 to 0.5 equivalent of the organophosphorus compound per equivalent of basic monomer.

The expression "equivalents of organophosphorus compound per equivalent of base" denotes the ratio of the weight of the organophosphorus compound added divided by its equivalent weight to the weight of polymer containing the aliphatic amine or quaternary ammonium monomer times its content of basic groups expressed as equivalents per unit weight. The expression "equivalents" denotes the formula weight divided by the number of functional (acid or basic) groups.

The bromine-containing monomers referred to herein are those monomers copolymerizable with acrylonitrile and include vinyl bromide, vinylidene bromide, 2-bromopropene, and 3-bromopropene. Further, representative bromine-containing monomers include methyl, ethyl, and butyl esters of alpha-bromoacrylic acid, beta-bromoethyl methacrylate, vinyl bromoacetate, alpha-bromostyrene, alpha-bromoacrylamide, 1-chloro-1-bromoethylene, and other mono-olefinic bromine-containing compounds which are copolymerizable with acrylonitrile. The weight percent of the bromine-containing monomer may be within range of from 1 to 15 weight percent, and preferably from 2 to 10 percent.

In addition to the aforementioned monomers, the polymers may contain 1–20 percent of other mono-olefinic monomers copolymerizable with acrylonitrile, including the acrylates, such as methyl acrylate, methyl methacrylate, ethyl methacrylate, butyl acrylate, methoxymethyl methacrylate, and the corresponding esters of acrylic and alpha-chloroacrylic acids; vinyl chloride, vinylidene chloride; methacrylonitrile; acrylamide and methacrylamide; alpha-chloroacrylamide, or monoalkyl substitution products thereof; methyl vinyl ketone; vinyl carboxylates, such as vinyl acetate, vinyl chloroacetate, vinyl propionate, and vinyl stearate; methylene malonic ester; itaconic dimethyl ester; N-vinyl carbazole; vinyl furane; styrene, vinyl naphthalene; and other non-acidic monomers.

The particular polymers to which the subject invention is addressed are the acid-dyeable acrylonitrile/bromine-containing polymers. As is known, the usual approach to improving the acid dye affinity of acrylic fibers is to incorporate sites for acid dyes in the polymers, i.e., by copolymerizing a basic monomer or monomers with acrylonitrile. The particular acid-dyeable acrylonitrile-containing polymers are those containing 8 weight percent or less of a basic monomer selected from the group consisting of aliphatic amines, substituted ammonium compounds, and mixtures thereof. Representative examples include the amino monomers, such as:

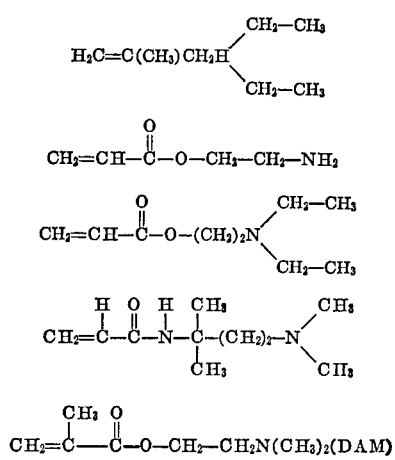

and the unsaturated quaternary ammonium monomers, such as:

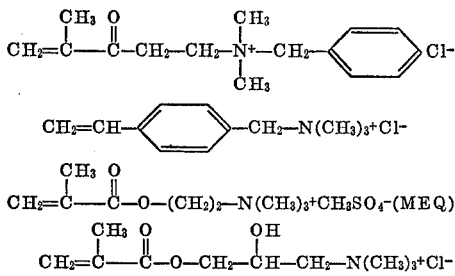

Initiator systems useful in preparation of these polymers include redox systems, such as $K_2S_2O_8$—$SO_2$, $Na_2S_2O_8$—$NaHSO_3$, $NaClO_3$—$Na_2S_2O_5$, azo initiators such as bisazoisobutyronitrile, and peroxides such as t-butylperoxypivalate and lauroyl peroxide. A wide variation in the equality of initiator is poisble. For example, from 0.02 to 3.0 percent by weight based on the polymerizable monomer may be all used. The initiator may be charged at the beginning of the reaction, or it may be added continuously or in increments throughout the reaction for the purpose of maintaining a more uniform concentration of free radicals in the reaction mass. The latter method is preferred because it tends to make the resultant polymer more uniform in its chemical and physical properties.

The blending of the various polymers may be practiced in a number of conventional ways. For example: A copolymer of acrylonitrile (AN) and dimethylaminoethylmethacrylate (DAM) of 80/20 ratio may be prepared. This polymer may be blended in 10/90 ratio with a 93/7 copolymer of AN and vinyl acetate (VA). A spinning solution is thereafter prepared containing about 25% solids of said blend with 0.32% (based on polymer) of 1-hydroxyethane 1,1-diphosphonic acid (HEDP) added. The resulting dope is blended in a 50/50 ratio with a 25% solids dope of 90% 10 AN/VBr copolymer. The blend dope is thereafter wet-spun in conventional manner to yield a heat stable acid-dyeable fiber. Other compositions which may be envisioned include:

| Composition | Polymer A | Polymer B | Polymer C | Additive |
|---|---|---|---|---|
| 1 | AN/VA/VBr/MEQ | | | HEDP |
| 2 | AN/MA/VBr | AN/DAM | | HEDP |
| 3 | AN/VA | AN/VA | AN/VBr | HEDP |
| 4 | AN/VBr | AN/MA/MEQ | | HEDP |
| 5 | AN/S/VBr/VCl₂ | AN/DAM/MEQ | | HEDP |

Note.—MA=Methylacrylate; S=Styrene; VCl₂=Vinylidene chloride; VBr=Vinyl bromide.

The single dope may be prepared incorporating all of the polymers and the diphosphonic acid additive, or separate dopes of each may be prepared to be blended prior to spinning. The additive in all cases should be added to the dope containing polymer "B."

The tests for fiber color, indicative of degree of whiteness, used throughout the examples consisted of measurements of purity (P) brightness (B) as calculated from the tristimulus values determined on a General Electric spectrophotometer. The method used is based on the Standard Observer and Coordinate System as recommended by the International Commission on Illumination, as fully set forth in the Handbook of Colorimetry published by the Technology Press, Massachusetts Institute of Technology in 1936. Although the complete specification of fiber color is dependent upon the combination of purity, brightness, and dominant wavelength, it is possible to grade the color for a series of fibers from the numerical values of brightness and purity alone provided the dominant wavelength is nearly the same. Such is the case in the examples to be cited as the dominant wavelength for the control and test samples never differed by more than 4 nm., e.g., 572–576 nm. Higher values of brightness (B) and/or lower values of purity (P) denote an improvement in fiber whiteness. Fiber brightness and purity values are determined for the various samples, cited in the examples, in their original condition and after heating for 25 minutes at 145° C., in a circulating air oven. A perfectly white fiber would have a purity of zero and a brightness of 100. The heat stability of the fiber is determined by the change in brightness ($\Delta B$) and purity ($\Delta P$) as a result of the heat treatment. Yellowness index (YI)

$$\frac{1.28(X)-1.06(Z)}{Y}\times 100$$

where X, Y, Z are tristimulus color values determined employing a General Electric spectrophotometer.

The acid uptake (ADU) of a fiber is related to the concentration of available basic groups within the polymer chain. This is a function of the concentration present and the reaction rate under the dyeing conditions. To determine the ADU of a fiber, a weighed sample of fiber was dyed using a 40:1 ratio of a 1% solution of Scarlet Red 4RA at pH 4.5 for 2 hours at 100° C. The dye uptake is measured indirectly by analysis of the exhausted dye bath. The acid dye uptake is calculated:

$$ADU=\frac{\text{Weight dye absorbed*}}{\text{Weight of fiber}}\times 100$$

*Scarlet Red 4RA (C.I. acid red 18, constitution number 16255).

The compositions of the instant invention present many advantages. For example, products formed from the polymer solutions of the instant invention are free of objectionable color and, therefore, of greater commercial value. In preparing the polymer solutions, heat can be applied without danger of objectionable color and, thus, the solutions are of greater commercial value. Further, when necessary, such solutions can stand for prolonged periods of time without developing an objectionable color. The organophosphorus compounds are readily available and inexpensive. Therefore, there is no great increase in production cost. The compositions containing the compounds may be prepared without going through detailed and elaborate procedures the necessitate expensive changes in the design of apparatus commonly used to manufacture acrylic and modacrylic fibers.

The following examples are illustrative rather than limitative and all parts, proportions, and percentages are by weight unless otherwise specified. The weight based on the polymer is designated as "bop."

EXAMPLE I

A continuous suspension polymerization was conducted to prepare a base polymer comprising 88.0 percent acrylonitrile, 7.0 percent vinyl acetate, and 5.0 percent vinyl bromide. The polymerization was initiated by potassium persulfate/sulfur dioxide/ferrous sulfate redox system. The pH of the reaction vessel was maintained at about 3.0 at a temperature of about 50° C.; the water to monomer ratio was about 4 to 1. A polymer, designated herein as an additive polymer, was prepared comprising about 70 percent acrylonitrile, 20 percent 2-methylacryloethyltrimethyl ammonium methylsulfate (MEQ), and 10 percent dimethylaminoethylmethacrylate (DAM) by the use of a catalytic system containing 0.2 part potassium persulfate, 0.1 part $SO_2$ and 0.5 p.p.m. $Fe^{++}$ added as ferrous sulfate. Sufficient nitric acid was added to maintain the pH at about 3. The additive polymer was thereafter admixed in the first polymer to form a blend, designated in the table as Example I, 1, 2 and 3 having 91.05 percent (bop) of the base polymer and 8.95 percent (bop) for the additive polymer; Run I, 4, contained 90.91 (bop) of base polymer and 9.09 percent (bop) of the additive polymer. A dimethylacetamide spinning solution was thereafter prepared comprising about 25 weight percent solids of the blend and the amount of 1-hydroxyethane 1,1-diphosphonic acid (HEDP) shown in the table, Example I, 1, 2, 3, 4. The polymer solution was heated to about 70° C., and held at that temperature and thoroughly mixed for about 60 minutes. The blends were thereafter spun into a spinning bath comprising an aqueous solution at 40° C., of dimethylacetamide (57 parts dimethylacetamide to 43 parts water). The spinning solution was extruded through a multiple hole spinnerette. The coagulated filaments were washed free of solvent in a boiling water cascade and stretched about 5.3× their original length. The filaments were thereafter dried by passing over heated rolls at about 130° C. The dried fiber was annealed in a steam autoclave at 32 p.s.i.g. Color properties of the fibers spun from the polymer treated with 1-hydroxyethane 1,1-diphosphonic acid (HEDP) were determined and compared with color properties of fibers spun from an untreated control (Run 1) of the same chemical composition. The fiber color was determined in terms of brightness and purity values for the blended polymer fibers in their original condition and after heating for 25 minutes at 145° C., in a circulating air oven. The resulting values for color (original and heated) and the heat stability are set forth in the table. The higher the brightness value (B) and/or the lower the purity value (P), the better the filament color. In considering the fibers of Run 1 it is noted that although there is a slight decrease in acid dyeability (percent ADU) the heat stability of the fiber improved as the amount of organophosphorus acid increased.

EXAMPLE II

A base polymer was prepared comprising 92.5 percent acrylonitrile and 7.5 percent vinyl acetate. The polymer was prepared in a manner similar to the base polymer of Example I. An additive polymer comprising 70 percent acrylonitrile, 20 percent MEQ, and 10 percent DAM was prepared as set forth for the additive polymer under Example I. The base polymer was blended with the additive polymer so that the additive polymer had about 9.23 percent (OWF) thereof in the blend. Three spinning solutions were thereafter prepared comprising 25 percent solids of the blend in dimethylacetamide and containing 1-hydroxyethane 1,1-diphosphonic acid (HEDP) in amounts as shown in the table, Example II, 1, 2, and 3. Fibers were then spun according to the process of Example I. Heat stabilities, shown in the table, were poor. It is shown by this example that the organophosphorus compound alone does not adequately stabilize the blend, resulting in heat stability of these fibers lower than Example I, 1 (control).

EXAMPLE III

A blend was prepared by mixing a base polymer comprising 92.5 percent acrylonitrile and 7.5 percent vinyl acetate with a second polymer comprising polyvinyl chloride. Two different samples were prepared one comprising one percent and another two percent (OWF) of the polyvinyl chloride. To this blend was added 9.23 percent (OWF) of an additive polymer comprising 70 percent acrylonitrile, 20 percent MEQ, and 10 percent DAM. A spinning solution of about 25 percent solids in dimethylacetamide and 1-hydroxyethane 1,1-phosphorus acid (HEDP) in the amounts shown in the table, Example III, Runs 1, 2, 3 and 4 was prepared and heated to about 70° C., and held at that temperature for about 60 minutes. The spinning solutions were thereafter extruded through a spinnerette into a spinning bath comprising 57 parts dimethylacetamide and 43 parts water at about 40° C., stretched 5.3×, washed to remove residual solvent, and dried. The fibers were then annealed. The heat stability of these blends (as shown in the table) were relatively low in comparison with fibers spun under Example I. This shows that chlorine is ineffective as a co-stabilizer for these acid-dyeable fibers.

EXAMPLE IV

Two different polymer blends were prepared and compared under this example. A first polymer was prepared comprising 89.8 percent acrylonitrile, 7.5 percent vinyl acetate, and 2.7 percent vinyl bromide. An additive polymer was prepared comprising 70 percent acrylonitrile, 20 percent MEQ, and 10 percent DAM. The two polymers were admixed to form a blend having 10.03 percent (OWF) of the additive polymer. This composition is shown in the table, Example IV, 1.

A second base polymer comprising 92.5 percent acrylonitrile and 7.5 percent vinyl acetate was prepared. To this second base polymer 12% of a terpolymer comprising 79.6 percent acrylonitrile, 5.4 percent vinyl acetate, and 15 percent vinyl bromide was added as well as 9.97% of an additive polymer comprising 70 percent acrylonitrile, 10% DAM and 20% MEQ. This polymer composition is shown in the table, Example IV, 2. A third composition was prepared with a lower amount of the Br-containing polymer (IV, 3).

The aforementioned polymer compositions were formed into spinning solutions comprising about 25 weight percent of said blend with dimethylacetamide and 0.3 equivalent HEDP for equivalent of basic groups. The spinning solution was thereafter spun through a multiple hole spinnerette into a spinning bath comprising an aqueous solution of dimethylacetamide and water (57/43) at 40° C. The fiber was thereafter stretched, washed, and dried and annealed as set for in Example I. The color properties of the fibers spun from polymers treated with organophosphorus compound were determined. The fiber (IV, 3) with 0.7% bromine had poorer heat stability that the other two, but IV, 2 had as good color properties as IV, 1, showing that the bromine may be added via a separate polymer and still exert a color stabilizing effect.

EXAMPLE V

Two base polymers as previously employed in Examples I and II were blend with additive polymers containing 70 AN/30 MEQ and 80 AN/20 DAM. These base polymers and additive polymers were blended in amounts as shown in the table. A 25 weight percent spinning dope solution was prepared in dimethylacetamide to which was added 0.3 equivalent HEDP per equivalent basic groups. The spinning solutions were heated about 70° C., filtered, and extruded through a spinnerette and thereafter processed as described in Example I. Fiber heat stabilities for the bromine-containing fibers (V, 1, 4) were far superior to those of the other (V, 2, 3). The fiber containing the tertiary amine base and that containing the tetra-substituted ammonium compound appeared to have equal response to the stabilization.

EXAMPLE VI

Two base polymers were prepared as in Examples I and II. An additive polymer was prepared comprising 50 weight percent acrylonitrile and 50 weight percent 2-methyl-5-vinyl pyridine. Into the base polymers 12 percent (bop) of the additive polymer was admixed. A 25 weight percent spinning dope solution in dimethylacetamide was prepared from the blend. The 1-hydroxyethane 1,1-diphosphonic acid (HEDP) was added to the solvent in the amounts as shown under Example IV, 1, 2, 3, and 4. The slurry was heated to effect solution and thoroughly mixed for about 1 hour at about 70° C., prior to spinning. The spinning solutions were thereafter filtered, and extruded through a spinnerette into a dimethylacetamide/water (57/43) coagulation bath, stretched 5.3×, washed to remove residual solvent, and dried. The color (heated and original) and heat stability of the fibers after steam annealing are given in the table, Example VI, 1, 2, 3, and 4. Neither the presence of the bromine or of the HEDP appeared to affect the heat stability of these fibers.

We claim:
1. A heat-stable, acid dyeable fiber comprising a polymer made up of at least 60 weight percent of acrylonitrile copolymerized with (A) 1 to 25 weight percent of a brominated ethylenically unsaturated monomer, (B) 1 to 20 weight percent of another mono-olefinic monomer copolymerizable with acrylonitrile and (C) 1 to 8 weight percent of a basic monomer copolymerizable with acrylonitrile and selected from the group consisting of free radical unsaturated aliphatic amines, substituted ammonium salts and mixtures thereof, said polymer also containing up to about one equivalent per equivalent of said basic monomer of an organophosphorus compound having the general formula:

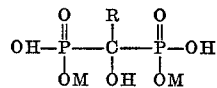

wherein M is a member selected from the group consisting of hydrogen, sodium, lithium, and potassium, and R is a member selected from the group consisting of an alkyl radical having one to eleven carbon atoms, a phenyl radical, and an alkyl phenyl radical containing no more than eight carbon atoms.

2. The fiber of claim 1 wherein the brominated monomer is vinyl bromide.

3. The fiber of claim 1 wherein the organophosphorus compound is 1-hydroxyethane 1,1-diphosphonic acid.

References Cited
UNITED STATES PATENTS

| | | | |
|---|---|---|---|
| 2,784,169 | 3/1957 | Slocombe | 260—45.7 |
| 3,149,089 | 9/1964 | Hayes | 260—45.7 |
| 3,410,819 | 11/1968 | Kourtz | 260—29.6 |
| 3,122,417 | 2/1964 | Blaser | 260—932 |
| 3,202,579 | 8/1965 | Berth et al. | 260—932 |
| 3,463,835 | 8/1969 | Budnick | 260—932 |

DONALD E. CZAJA, Primary Examiner

V. P. HOKE, Assistant Examiner

U.S. Cl. X.R.

8—177 R; 260—29.6 AN, 29.6 MP, 88.7 D, 88.7 B, 88.7 E